Dec. 16, 1930. F. C. HINCKLEY 1,785,553
SOUND AMPLIFYING MEANS
Filed March 12, 1926 4 Sheets-Sheet 1

INVENTOR.
Frank C. Hinckley
BY
ATTORNEY

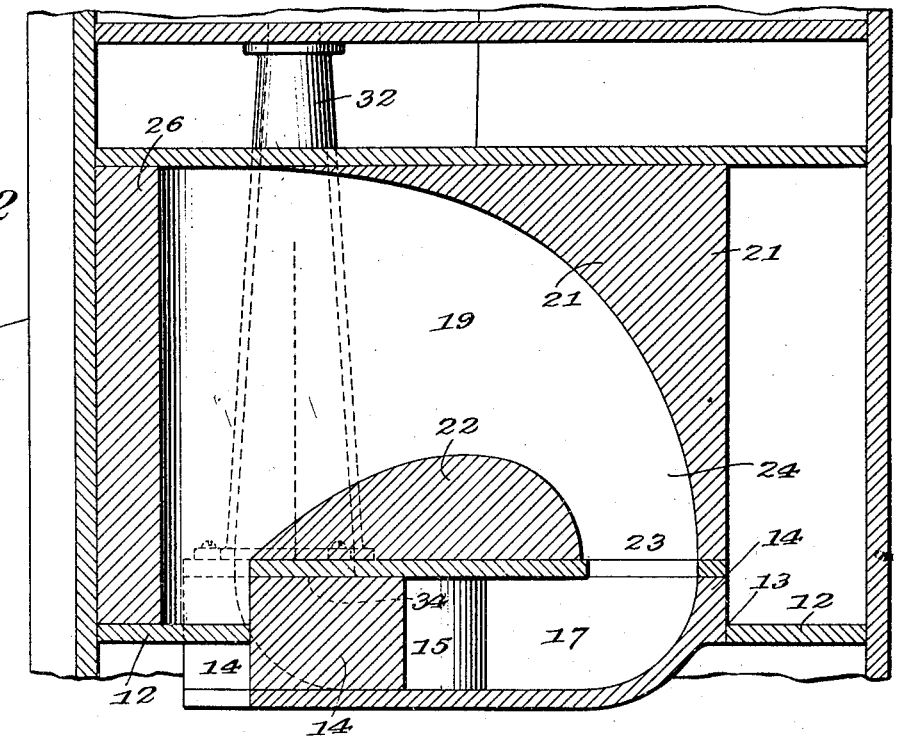
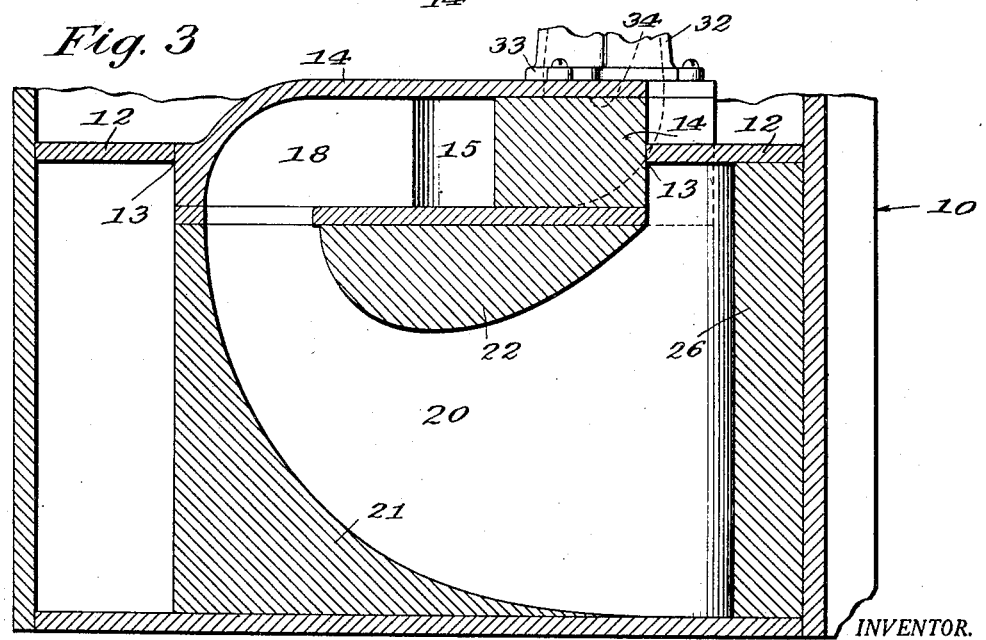

Dec. 16, 1930.  F. C. HINCKLEY  1,785,553
SOUND AMPLIFYING MEANS
Filed March 12, 1926  4 Sheets-Sheet 3

INVENTOR.
Frank C. Hinckley
BY
ATTORNEY

Dec. 16, 1930.    F. C. HINCKLEY    1,785,553
SOUND AMPLIFYING MEANS
Filed March 12, 1926    4 Sheets-Sheet 4

INVENTOR.
Frank C. Hinckley
BY
ATTORNEY

Patented Dec. 16, 1930

1,785,553

UNITED STATES PATENT OFFICE

FRANK C. HINCKLEY, OF STRATFORD, CONNECTICUT, ASSIGNOR TO COLUMBIA PHONOGRAPH COMPANY, INC., OF BRIDGEPORT, CONNECTICUT, A CORPORATION OF NEW YORK

SOUND-AMPLIFYING MEANS

Application filed March 12, 1926. Serial No. 94,177.

This invention relates to new and useful improvements in acoustics, and particularly, to sound amplifiers and amplifying systems for use in sound reproducing apparatus and systems, such as loud speaking telephones, radios, and phonographs, and has general application wherever sound is to be amplified.

An object of the invention is to provide a means for amplifying sound without at the same time distorting it; which means will insure that a regularity and continuity of flow shall be induced whereby a balance of all the various tones is effected in a manner faithful to the notes and tones of the original production.

Another object is to provide an amplifier of such length that great volume is obtained, and which is so constructed that the amplified sounds when emitted are soft and diffused, and in which the mechanical and disturbing metallic and other sounds are eliminated.

Still another object is to provide an amplifier which while of great length, occupies the minimum amount of space.

A further object is to provide an amplifier in which sound being amplified is divided at a pre-determined point and maintained in its divided state until it passes from the amplifier.

In phonographs as commonly constructed cabinets are formed with a compartment or division arranged to receive a motor, and above which is mounted the turntable or record support together with the reproducer and tone-arm in a manner well known in the art. In such instruments the sound passes through the tone-arm into a distributing horn or horns these latter being made either of plain tapered or curved trumpet like form or the sound passages are of sinuous construction, sometimes delivering into a common outlet chamber or into two or more separate or divided off compartments. Similarly phonographs have been constructed in the past in which the sound waves were delivered initially through one conduit and then caused to be divided by a partition and to flow into a pair of separate chambers, such chambers receiving the sound waves from openings or passages provided in the partition member and from thence the divided volume was delivered to the outer distributing separate trumpets or flared ends of the chambers or caused to merge and pass through one common mouth piece or outer opening.

Other objects and advantages will become more apparent from a consideration of the following description, taken in connection with the accompanying drawings, wherein one embodiment of the invention is shown adapted for use with a reproducing phonograph.

In the drawings:

Fig. 2 is a vertical sectional view through the upper part of the device and on the line 2—2 of Fig. 4.

Fig. 3 is a vertical sectional view through the lower part of the apparatus, the view being taken substantially along the line 3—3 of Fig. 5.

Figure 1:
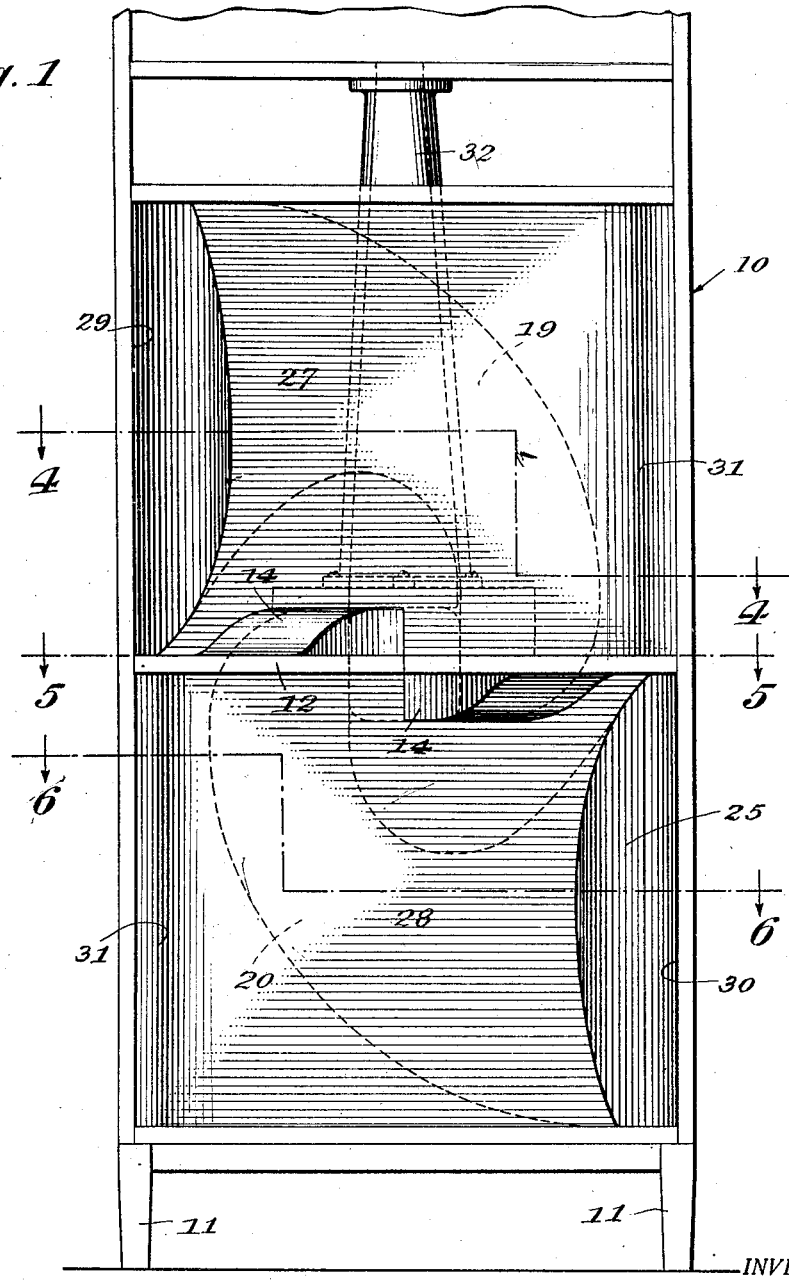
Fig. 1 is a front elevation of one embodiment of the invention, the amplifier being disposed within a cabinet of the type actually used in connection with phonographs or talking machines.
Figure 4:
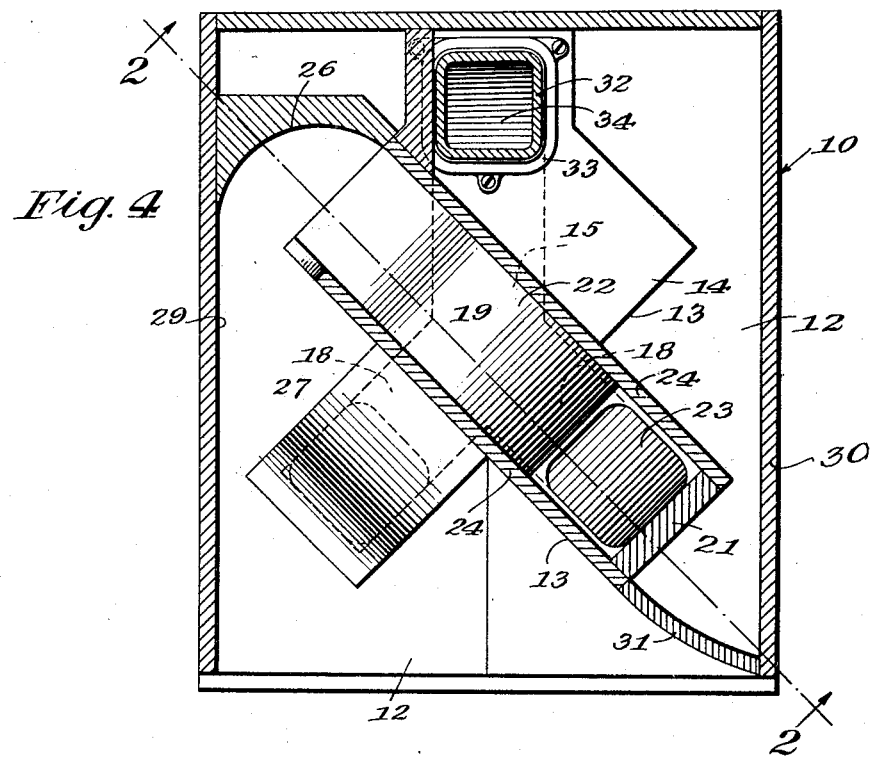
Fig. 4 is a transverse sectional view on the line 4—4 of Fig. 1.
Figure 5:
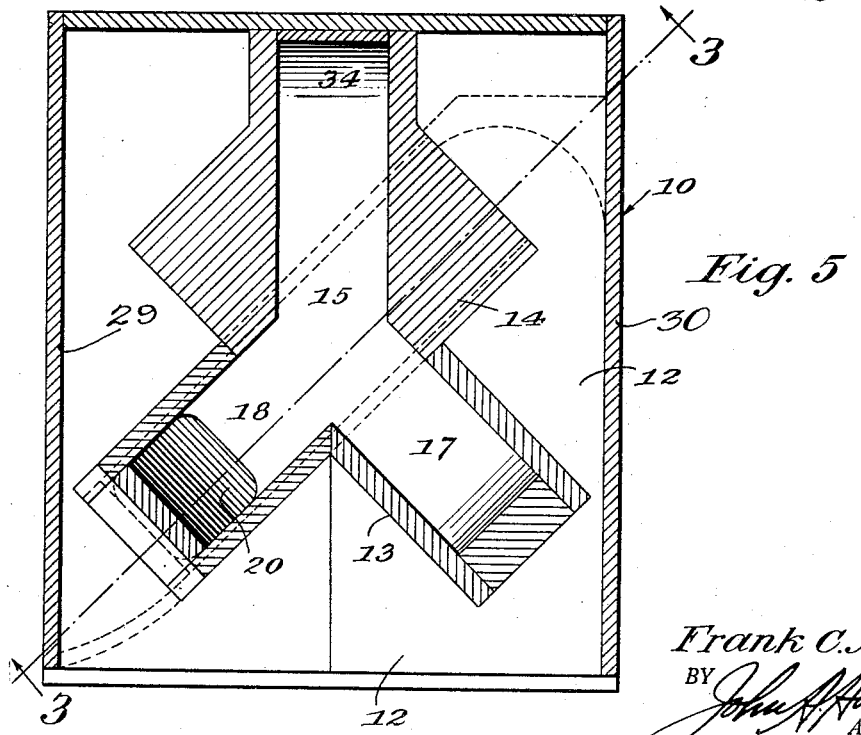
Fig. 5 is a similar view on the line 5—5 of Fig. 1.
Figure 6:
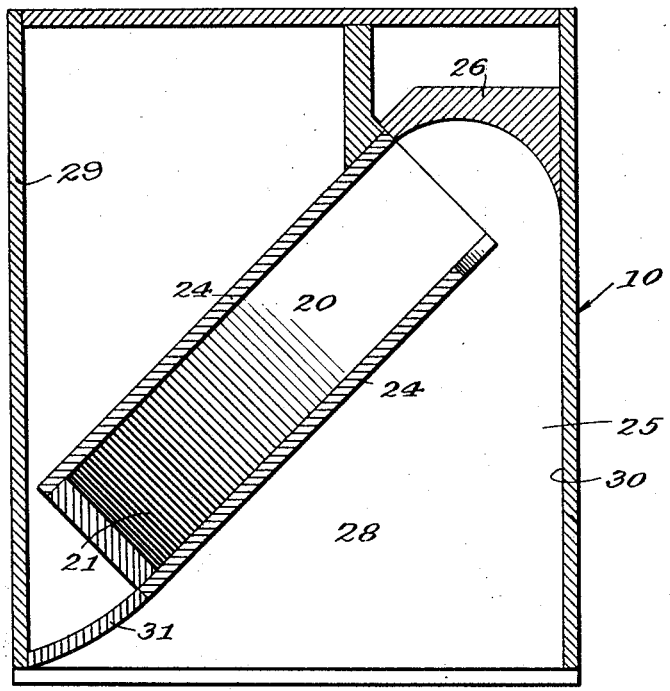
Fig. 6 is a similar view on the line 6—6 of Fig. 1.

Referring in detail to the drawings,—10 indicates an enclosure, or a phonograph cabinet, as the case may be. In this connection, it will be understood that the part 10 may be a phonograph cabinet having the major portion of the amplifier built into it, or it may be made up as an independent unit forming part of the amplifier, and not forming part of the cabinet, and in which are mounted the remaining parts. Should the amplifier be made up as a unit with the enclosure 10, it would be adapted to be slid into a phonograph cabinet. If the enclosure is to be a phonograph cabinet, then it is provided with legs, as shown at 11 in Fig. 1.

Figure 7:
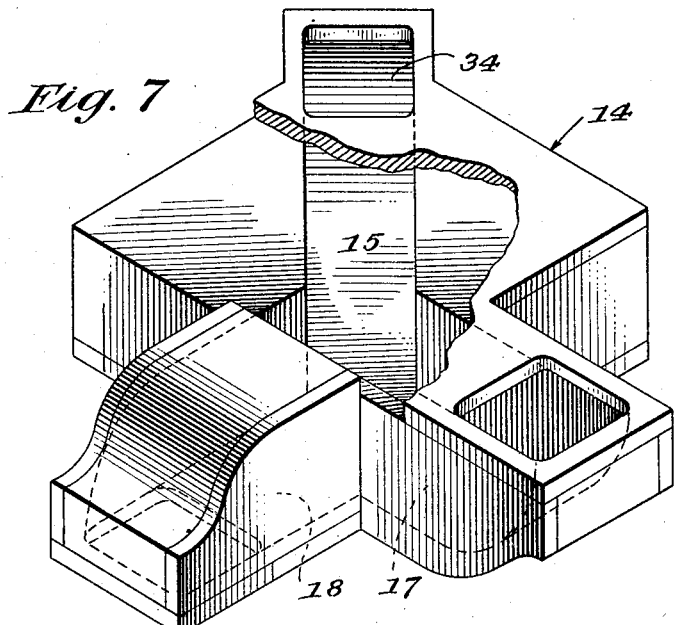
Fig. 7 is a perspective view, parts being broken away, of the dividing or Y-shaped portion of the amplifier.

When making up an amplifier in accordance with the present invention, the enclosure 10 is provided midway its length with a partition or board 12 having a cut-out 13 adapted to snugly receive a member or block 14 (Fig. 7) and embrace it at its longitudinal axis. This block has a substantially Y shaped passage 15 of constant cross-sectional area therethrough, one of the arms of the Y communicating with an opening in the top of the block 14, and the other of the arms communicating with a like opening in the bottom of the block. Preferably, member or block 14 is of rigid non-vibratory material (either wood or metal), and is adapted to deliver the sound through its arms in the same condition in which it is received. Lack of sympathetic vibration in the block prevents distortion of the sound while passing through it.

Also, as the sound passes through block 14, it is divided, and that portion of it coming by way of the arm 17 is delivered into an upper diagonally disposed horn 19, while the sound passing through the arm 18 is delivered to a lower diagonally disposed horn 20. The horns, as shown, are arranged at right angles, although such angular relationship may be varied. Each of the horns 19 and 20 are of similar construction.

These horns each comprise a pair of heavy non-vibratory spaced blocks 21 and 22. The blocks are so cut, relatively, as to permit vertical expansion of the sound waves from the time they enter the horn at the point 23 until they pass from the horn. Side boards 24 also of heavy rigid stock make lateral closures for the space between the blocks 21 and 22, and in addition, are so secured to them as to hold the blocks in their relative spaced relation.

The upper diagonal horn 19 is, of course, disposed on the upper surface of block 14, and is rigidly secured thereto in any suitable manner, as by means of glue, bolts or the like. Also, horn 20 is disposed on the bottom 25 of the enclosure 10, and is secured thereto and to the bottom of block 14. These horns, if desired, may be made of metal.

As is readily apparent from an inspection of the drawings, the mouths of the horns 19 and 20 are disposed toward the opposite rear corners of the enclosure or cabinet 10. This arrangement permits of a further amplifying chamber being arranged both above and below partition 12. To accomplish this, a curved reflecting board 26 is provided near that corner of each of the compartments, to which the sound is directed by the horns 19 and 20. The sound passing from said horns impinges against these boards, and is projected forward through a resonance chamber or additional amplifying horn 27 in the case of the upper chamber, and 28 in the case of the lower chamber. Side 29 of the upper compartment forms one wall of the additional chamber or horn 27, while side 30 of the lower compartment plays the same part for the chamber or horn 28. To complete these resonance chambers, or additional horns after the horns 19 and 20 are in place, it is but necessary to position and secure the curved parts or elements 26, and to insert fillers 31 between the forward corners of horns 19 and 20, and the forward adjacent corners of the enclosure 10.

Arrangement of the horns as just described, provides for the insertion of an amplifier of great length into a housing or cabinet of convenient size. The amplifier is doubled back on itself in each of the compartments by means of the diagonally disposed horns 19 and 20, and is brought forwardly again by means of horns or chambers 27 and 28. Horns 19 and 20 permit of vertical expansion of the sound while horns 27 and 28 permit of its lateral expansion. In this way, provision is made for the proper expansion of the sound and at the same time a long amplifier is confined in a small space.

After the horns have been thus positioned in place, it is but necessary to arrange a metal or other rigid non-vibratory conductor 32 in place. As shown, the conductor increases in cross-sectional area towards its lower end. The positioning of the conductor is very easily accomplished, since as shown, it is provided with a lower flange 33 having spaced holes therethrough, through which screws or the like may be passed to secure it in place. It is so secured that the opening through it registers with the inlet opening 34 at the base of the stem of the Y shaped passage already mentioned.

The upper end of conductor 32 is likewise provided with a perforated flange, by means of which it may be secured to a motor-board or the like, and when the complete phonograph is assembled, the inner end of the tone-arm will communicate with the upper end of the conductor.

As will be readily understood, sound enters the amplifier through the rigid non-vibratory conductor 32 from whence it passes through the inlet opening 34 into the Y-shaped passage 15, of the block or member 14. The sound is divided in passageway 15, part of it passing through arm 17 and the remainder passing through arm 18. That portion of the sound which passes through arm 17 enters into the upper diagonal horn 19 at 23 (see Fig. 2) and from said upper diagonal horn is projected against the curved reflecting board 26 which reflects the sound outwardly through the upper chamber 27. In like manner, the sound which passes through arm 18 of the Y-shaped passage 15, enters into the lower diagonal horn 20 (see Fig. 3) from whence it is delivered against the lower curved reflecting board 26 to be projected outwardly through the lower chamber 28.

It will now be readily apparent that once the sound being amplified has been divided in the Y-shaped passage 15, that sound is maintained in its divided or separated state until it is finally emitted from the upper and lower resonance or amplifying chambers 27 and 28 respectively. There is no time at which the sound being amplified, after it has once been divided, may be reunited or discharged into a common receiver while passing through the amplifier.

From the foregoing, it will be readily seen that I have provided an amplifier of great length, and one which is confined within a minimum area. As actually constructed, amplifiers in accordance with this invention are approximately 11 feet long, and give wonderful results, both as to volume and naturalness of the amplified sound. These results are believed to be due to the length of the sound passage, the manner in which the expansion of the sound is controlled, and to the release of the sound in the chambers 27 and 28 from which it passes in intersecting planes. The last distinguishes over the projecting of the sound from the amplifier in a column, or columns, and the divergent paths of travel of the sound cause it to envelop a listener, rather than strike against him.

While I have shown and described a preferred embodiment of the invention, as adapted to one use, it is to be particularly understood that I do not wish to be limited to such adaption and construction, since many changes in the construction and arrangement of the parts, within the scope of the appended claims, to which reference must be had for a definition of the limitations of the invention, will be readily apparent to those skilled in the art.

Having thus described the invention, what I claim is:

1. In an amplifier, an enclosure having a plurality of superposed compartments, amplifying means in each of said compartments, and said amplifying means being arranged relatively to cause the sound directed from one of them to intersect the plane in which sound is directed from another of them.

2. In an amplifier, a pair of chambers, a member having a Y shaped passage therethrough provided with an inlet and a pair of outlets, one of the outlets communicating with only one of said chambers and the other outlet communicating only with the other of said chambers, a horn disposed in each of said chambers and each of said horns communicating with one of said outlets, and a resonance chamber in each of said first mentioned chambers and communicating with the respective horns.

3. In a sound amplifier, upper and lower chambers, a member having a horizontally disposed Y shaped passage, said member disposed within said amplifier and having an inlet and a pair of outlets, one of the outlets communicating with only one of said chambers, a horn arranged diagonally within each of said chambers and communicating with the respective outlets of the Y shaped passage, said horns having their discharge ends disposed toward opposite rear corners of the amplifier, a reflection surface in each of said chambers to receive sound emitted from the respective horns and to reflect it in the opposite direction, and one side of each of said horns cooperating with the adjacent side of its chamber to form a resonance chamber into which the reflecting surface directs the sound.

4. A device as in claim 3, wherein the resonance chambers are disposed to direct the sound outwardly therefrom in intersecting planes.

5. In an amplifier, a pair of superposed compartments, a pair of chambers in each of said compartments, means for delivering sound to one chamber in each compartment, chambers in the respective compartments being in communication and arranged side by side and at an angle to the corresponding chambers in the other compartment.

6. An amplifying chamber, comprising a pair of side boards and a pair of blocks arranged between said boards, one of said blocks closing the space along two edges of each of the boards and having its inner surface curved, the other of said blocks partly closing the side along the third edge of each of the boards but spaced from the first block to provide a relatively small inlet passage, said second block having its inner surface curved, said blocks leaving the space between the fourth edge of each of said boards free whereby an exit opening is formed.

7. In a sound reproducing mechanism, an amplifier of great length divided into a multiplicity of chambers placed in an enclosure including side walls and forming with the walls additional amplifying chambers.

8. In combination, a cabinet including side walls, a structure disposed within said cabinet and said structure including complete portions of an amplifier and incomplete portions of an amplifier, the portions of said structure forming incomplete portions of an amplifier adapted to cooperate with side walls of the cabinet whereby a complete amplifier is provided.

9. A sound amplifier comprising in combination, an enclosure having a plurality of compartments and amplifying means in each of said compartments so arranged relatively that one wall of one of said amplifying means lies in a plane which intersects, within the closure, the plane of one wall of one of the others.

10. A sound amplifier comprising in combination means for dividing the sounds to be amplified, a horn on each side of said means and receiving the sound therefrom and a pair of tone chambers receiving the sound from said horns and each having one wall, the plane of which intersects, within the enclosure, the plane of one wall of the other.

11. A sound amplifier according to claim 10 in which the horns are of the same size and tapered from their entrance to their exit openings and the tone chambers are of the same size.

12. A sound amplifier according to claim 10 in which the horns are arranged at an inclination to one another so that they direct the sound to opposite rear corners of the enclosure or cabinet containing the amplifier.

13. An amplifier comprising a pair of chambers, a member having a Y-shaped passage therethrough provided with an inlet and a pair of outlets, one of which latter communicates with only one of said chambers while the other outlet communicates only with the other of said chambers, a horn disposed in each of said chambers and each communicating with one of said outlets and a resonance chamber in each of said first-mentioned chambers and communicating with the respective horns.

14. A sound amplifier according to claim 13 in which the resonance chambers are of the same size.

15. A sound amplifier comprising in combination, means for dividing the sounds to be amplified, a horn on each side of said means and receiving the sound therefrom, and a pair of tone chambers receiving the sound from said horn and each having one wall, the plane of which intersects, within the enclosure, the plane of one wall of the other, said horns being of the same size and tapered from their entrance to their exit openings, said tone chambers being of the same size and said horns arranged at an inclination to one another whereby they direct the sound to opposite rear corners of the enclosure of the cabinet containing the amplifier.

16. In an amplifier, a pair of chambers, a member having a passage therethrough provided with an inlet and a pair of outlets, one of said outlets communicating with only one of said chambers and the other outlet communicating only with the other of said chambers, a horn disposed in each of said chambers and each of said horns communicating with one of said outlets, a resonance chamber in each of said first mentioned chambers and communicating with the respective horns, and said resonance chambers so disposed as to direct the sound outwardly therefrom in intersecting planes.

Signed at Bridgeport, in the county of Fairfield, and State of Connecticut, this 10th day of March, A. D. 1926.

FRANK C. HINCKLEY.